(12) United States Patent
Pruitt et al.

(10) Patent No.: US 12,000,510 B2
(45) Date of Patent: Jun. 4, 2024

(54) SWAY BRACE ATTACHMENT

(71) Applicant: Eaton Intelligent Power Limited, Dublin (IE)

(72) Inventors: Phillip Warren Harmon Pruitt, Carlyle, IL (US); David Henry Petry, Jr., O'Fallon, IL (US); Jacob Lee Johnson, New Baden, IL (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 352 days.

(21) Appl. No.: 17/399,712

(22) Filed: Aug. 11, 2021

(65) Prior Publication Data

US 2022/0049518 A1 Feb. 17, 2022

Related U.S. Application Data

(60) Provisional application No. 63/064,187, filed on Aug. 11, 2020.

(51) Int. Cl.
*F16L 3/24* (2006.01)

(52) U.S. Cl.
CPC ...................................... *F16L 3/24* (2013.01)

(58) Field of Classification Search
CPC .... F16L 3/24; F16B 2/065; F16B 2/06; F16B 35/005
See application file for complete search history.

(56) References Cited

U.S. PATENT DOCUMENTS

| | | | |
|---|---|---|---|
| 6,098,942 A * | 8/2000 | Heath | F16B 2/065 248/228.6 |
| 6,273,372 B1 | 8/2001 | Heath | |
| 7,191,987 B2 | 3/2007 | Heath | |
| 7,431,252 B2 | 10/2008 | Birli et al. | |
| 7,988,464 B2 | 8/2011 | Kossak et al. | |
| 8,096,816 B2 | 1/2012 | Kossak et al. | |
| 8,132,767 B2 | 3/2012 | Oh et al. | |
| 8,434,725 B2 | 5/2013 | Oh et al. | |
| 8,534,625 B2 * | 9/2013 | Heath | F16B 2/06 248/65 |
| 8,882,056 B2 | 11/2014 | Greenfield | |
| 9,239,067 B2 * | 1/2016 | Heath | F16L 3/24 |
| 9,611,874 B2 * | 4/2017 | Heath | F16L 3/24 |
| 10,948,002 B2 * | 3/2021 | Haddock | F16B 2/065 |
| 2009/0183443 A1 | 7/2009 | Osborn et al. | |
| 2013/0020447 A1 | 1/2013 | Heath et al. | |
| 2019/0137009 A1 | 5/2019 | Schickling et al. | |
| 2022/0049518 A1 * | 2/2022 | Pruitt | F16L 3/24 |

FOREIGN PATENT DOCUMENTS

| | | |
|---|---|---|
| JP | 06340222 B2 | 6/2018 |
| KR | 2019015856 A | 2/2019 |

OTHER PUBLICATIONS

First Examination Report, and translation thereof, from EG Application No. 2021/1266, dated Aug. 3, 2023, 10 pages.

* cited by examiner

*Primary Examiner* — Andrew J Triggs

(74) *Attorney, Agent, or Firm* — Stinson LLP

(57) ABSTRACT

The present disclosure is generally directed to a sway brace attachment for a bracing system comprising a body defining at least one slot for receiving a flange of a structural support of a building, a set screw bar coupled to the body, and set screws threadably received in threaded openings defined by the set screw bar.

19 Claims, 3 Drawing Sheets

SWAY BRACE ATTACHMENT

REFERENCE TO RELATED APPLICATIONS

This application claims the benefit of U.S. Provisional Patent Application No. 63/064,187, filed Aug. 11, 2020, the contents of which are incorporated by reference herein.

FIELD OF THE DISCLOSURE

The present disclosure generally relates generally to devices for bracing pipes and other loads, suspended below floors or ceilings, against sway and seismic disturbances, and, in particular, to a sway brace attachment for firmly gripping a building support, such as a beam, or other flanged structures.

BACKGROUND OF THE DISCLOSURE

There is a multitude of products in the market utilized by building and plumbing contractors for bracing and supporting pipes, ducts, sprinkler systems, fans, air-conditioners and other loads below floors and ceilings. These products include clamps, braces, hooks, straps, plates, brackets, among other items. Typically, one end of a brace is attached to the load while the other end is attached to a beam, or other support structure, on a floor or a ceiling.

SUMMARY OF THE DISCLOSURE

In one aspect, a sway brace attachment for a bracing system generally comprises a body, a set screw bar, and set screws. The body defines at least one slot for receiving a flange of a structural support of a building. The set screw bar is coupled to the body. The set screw bar has opposite end portions disposed outside the body. Each of the opposite end portions of the set screw bar defines a threaded opening extending through the set screw bar. The set screws are threadably received in the threaded openings of the set screw bar. The set screws are configured to be tightened within the threaded openings to engage the flange of the structural support received in the at least one slot and secure the sway brace to the flange.

DETAILED DESCRIPTION OF THE DISCLOSURE

Figure 1:
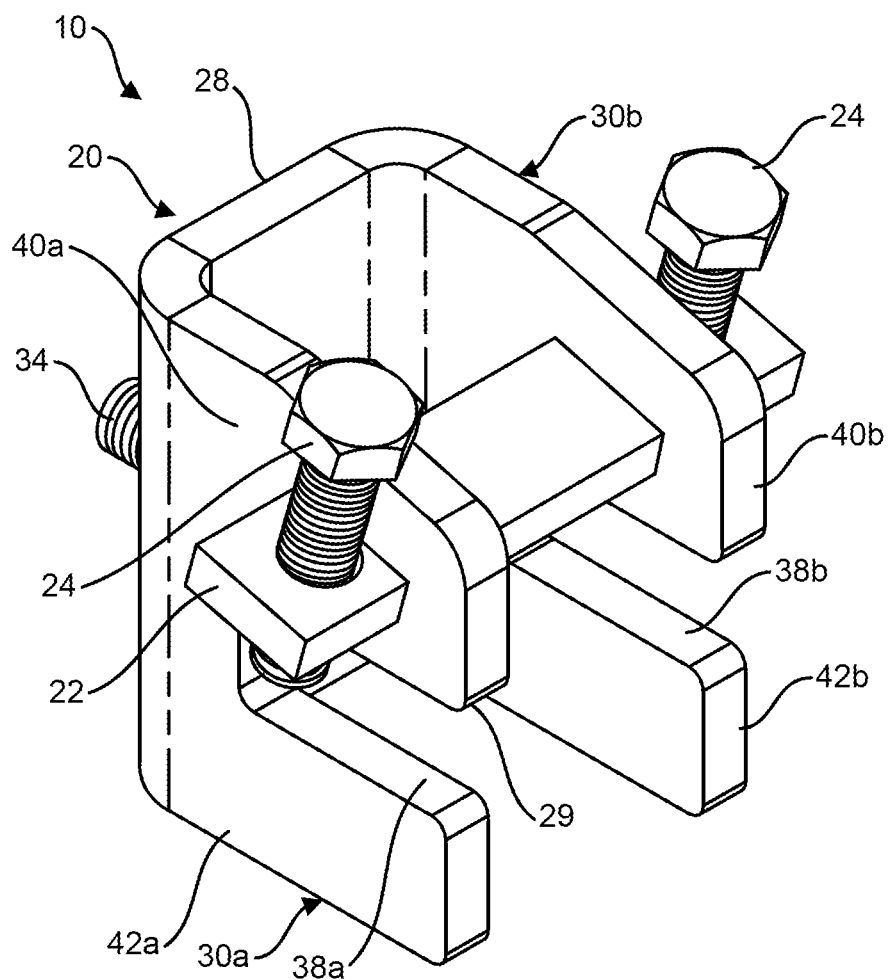
FIG. 1 is a perspective of one embodiment of a sway brace attachment.

Referring to FIG. 1, an illustrated embodiment of a sway brace attachment configured to attach to a beam or other flanged structural support of a building, for example, is generally indicated at reference numeral 10. The structural support may be an I-beam, for example, or the sway brace attachment 10 can be utilized with other types of beams, flanged members and other support members including, for example, wide flange beams, open web and welded truss beams, C-channel, metal trusses, structural steel and the like. The sway brace attachment 10 is configured to be coupled to a sway brace, which is turn, is couplable to a non-structural component, such as a pipe that runs generally perpendicular with respect to the beam or other structural support. The non-structural component may run generally parallel to the beam or run at an oblique angle relative to the beam. That is, the sway brace attachment 10 can be a lateral or longitudinal sway brace, as is generally understood in the art. Moreover, the non-structural component can be any kind of pipe, ducting, electrical conduit or any other member for which bracing is desired.

The sway brace attachment generally includes a body, generally indicated at 20, a set screw bar 22 coupled to the body, and at least one set screw 24 (e.g., two set screws or more than two set screws) coupled to the set screw bar. The illustrated body 20 is generally C- or channel-shaped, although it may be of other shapes. Referring to FIG. 1, the illustrated body 20 includes a back wall 28 and opposing left and right side walls, generally indicated at 30a, 30b, respectively, extending forward from the back wall. Together, the back wall 28 and the side walls 30a, 30b define an open channel 29 having open upper and lower ends and an open front side. In the illustrated embodiment, the body 20 is integrally formed as a one-piece, monolithic component. For example, the body 20 may be fabricated from sheet metal, such as steel or other metal, as would be readily apparent by one of ordinary skill in the art.

Figure 2:
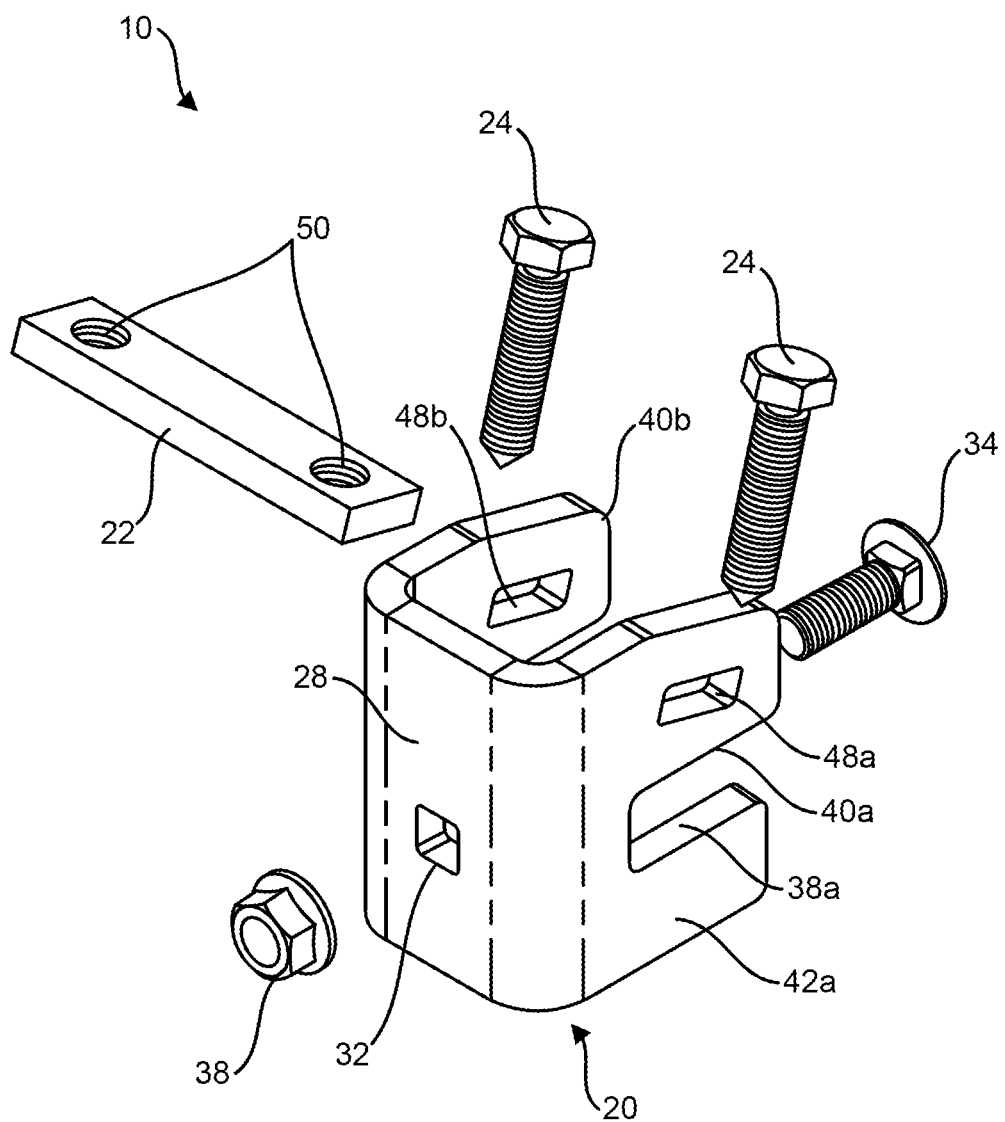
FIG. 2 is an exploded perspective of the sway brace attachment.

As shown in FIG. 2, the back wall 28 defines an opening 32 through which a fastener 34 (e.g., a bolt or screw) is received. As shown best in FIG. 3, a threaded shaft of the fastener 34 extends rearward from the back wall 28 when received in the opening 32, and a head of the fastener is received in the channel 29. The illustrated opening 32 has a polygonal shape (e.g., rectangular) that is sized to receive a similarly shaped shoulder of the fastener 34 to inhibit rotation of the fastener relative to the back wall 28. The fastener 34 is used to attach a sway brace (e.g., an adaptor of the sway brace) to the sway brace attachment. Sway braces that can be attached to the sway brace attachment 10 using the fastener 34 are generally known. Non-conventional sway braces may also be used. A nut 38 may be threaded on the fastener 34 and used to fasten the sway brace to the sway brace attachment 10 in a conventional manner which would be readily understood by those of ordinary skill the art. The fastener 34 and the body 12 are configured such that the fastener is captured within the opening 32 when the sway brace attachment 10 is attached to the structural support. In particular, the opening 32 (and the axis of the fastener 34) is generally aligned with the axis A1 of the slots 38a, 38b and the depths of the slots are such that head of the fastener will contact the flange of the structural support when received in the slots to inhibit the fastener from fully withdrawing and fall out of the opening. This allows a user to attach the sway brace attachment 10 to the structural support and then afterward attaching the sway brace to the attachment without the bolt falling out.

Figure 3:
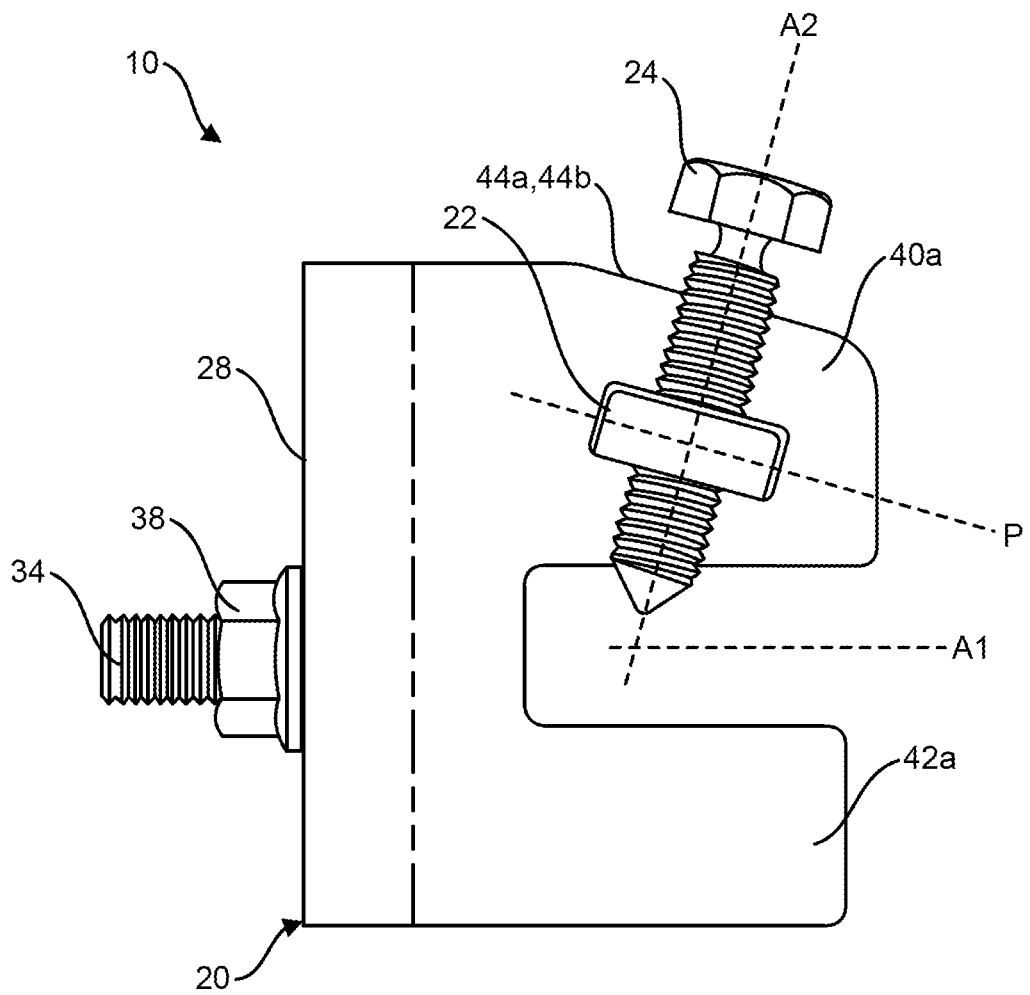
FIG. 3 is a side elevation of the sway brace attachment.

The left and right side walls 30a, 30b define slots 38a, 38b, respectively, extending through a front of the respective side walls toward the back wall 28. The slots 38a, 38b are generally aligned with and oppose one another and are sized and shaped to receive a flange (or other portion) of the structural support (e.g., a flange of a beam, such as an I-beam). Accordingly, the left and right side walls 30a, 30b may be generally C-shaped. The left and right side walls 30a, 30b include upper arms 40a, 40b and lower arms 42a, 42b on opposite sides of the respective slots 40a, 40b. As indicated in FIG. 3, upper surfaces 44a, 44b of the left and right side walls 30a, 30b (e.g., upper surface of the upper arms 40a, 40b) are chamfered or beveled toward the front side of the sway brace 10 to provide clearance for the set screws 24 to be tightened down without contacting the body 20. This clearance allows the set screws 24 to be located closer to the side walls 30a, 30b and reduces the length requirement of the set screws.

As shown in FIG. 2, the side walls 30a, 30b (e.g., the upper arms 40a, 40b) define aligned and opposing openings 48a, 48b, respectively, disposed above the slots 40a, 40b. The openings 48a, 48b are sized and shaped to receive and capture the set screw bar 22 therein. In the illustrated embodiment, the openings 48a, 48b are generally rectangular, similar to the set screw bar 22, having a slightly larger area than the cross section of the bar so that the set screw bar is slidably receivable therein and captured. The openings 48a, 48b are configured such that when the bar 22 is received therein, the bar is tilted or sloped downward toward the front side of the attachment 10. In this way, as shown best in FIG. 3, a plane P of the bar 22 is angled relative to the axes A1 of the slots 40a, 40b. For example, the bar 22 may be angled between about 10 degrees and about 60 degrees, or about 15 degrees to about 30 degrees, or in one example about 15 degrees. As coupled to the side walls 30a, 30b, opposite end portions of the set screw bar 22 extend outward from the corresponding side walls 30a, 30b (e.g., upper arms of the corresponding side walls). The opposite ends of the bar 22 define openings 50 configured to receive set screws 52. The illustrated openings 50 are threaded to threadably receive the set screws 52. The axes A2 of the openings 50 (and axes of the fasteners, indicated by the same reference numeral) extend at an acute angle (i.e., less than 90 degrees) from the longitudinal axis of the bar 22 and the axis defined by the slots 40a, 40b to enhance the strength of the connection to the beam or other structural support. In this way, the set screws 24 engage the flange of the structural support outside the body 20 and the channel 29 and at an angle less than 90 degrees (i.e., an acute angle) when threaded through the openings 50. For example, the set screws 24 may engage the flange at an angle from about 85 degrees to about 60 degrees, or from about 80 degrees to about 75 degrees. The set screws 24 may have torque off head that are sheared off the screws after a predetermined or threshold amount of torque is applied to the head.

Modifications and variations of the disclosed embodiments are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A sway brace attachment for a bracing system, the sway brace attachment comprising:
   a body comprising a back wall and opposing left and right side walls extending forward from the back wall, wherein the each of the left and right side walls defines a slot extending towards the back wall for receiving a flange of a structural support of a building;
   a set screw bar coupled to the body, the set screw bar having opposite end portions disposed outside the body, each of the opposite end portions of the set screw bar defining a threaded opening extending through the set screw bar; and
   set screws threadably received in the threaded openings of the set screw bar, wherein the set screws are configured to be tightened within the threaded openings to engage the flange of the structural support received in each slot and secure the sway brace to the flange.

2. The sway brace attachment set forth in claim 1, wherein the body is generally channel-shaped having open upper and lower ends and an open front side.

3. The sway brace attachment set forth in claim 2, wherein upper ends of the left and right side walls are chamfered downward toward the front side of the body to provide clearance for tightening the set screws.

4. The sway brace attachment set forth in claim 1, wherein the back wall defines an opening configured to receive a fastener to secure a sway brace to the sway brace attachment.

5. The sway brace attachment set forth in claim 1, wherein the set screw bar is slidably received in opposing openings defined by the left and right side walls.

6. The sway brace attachment set forth in claim 1, wherein the left side wall and the right side wall are generally C-shaped.

7. The sway brace attachment set forth in claim 1, wherein each of the left side wall and the right side wall has an upper arm and a lower arm on opposite sides of the respective slot.

8. The sway brace attachment set forth in claim 7, wherein the upper arm of the left side wall and the upper arm of the right side wall each have a lower surface partially defining the respective slot and an upper surface opposite the lower surface, wherein the upper surface is chamfered forward from the back wall.

9. The sway brace attachment set forth in claim 7, wherein the upper arm of the left side wall and the upper arm of the right side wall define aligned and opposing openings configured to receive the set screw bar.

10. The sway brace attachment set forth in claim 9, wherein the openings of the upper arms are configured to slope the set screw bar down from the back wall when the set screw bar is received therein.

11. The sway brace attachment set forth in claim 10, wherein the set screw bar is angled from about 10 degrees to about 60 degrees with respect to the longitudinal axes of the slots when the set screw bar is received in the slots.

12. The sway brace attachment set forth in claim 10, wherein the set screw bar is angled from about 15 degrees to about 30 degrees with respect to the longitudinal axes of the slots.

13. The sway brace attachment set forth in claim 1, wherein each slot defines a longitudinal axis along which the flange is slidably received in the slot, wherein axes of the set screws extend at an acute angle relative to the axis of each slot.

14. The sway brace attachment set forth in claim 1, wherein the set screws include torque off heads.

15. The sway brace attachment set forth in claim 1, wherein the body is a one-piece, monolithic component.

16. The sway brace attachment set forth in claim 1, wherein each slot has a depth configured to allow fastener to contact the flange of the structural support when the fastener is received within the threaded opening extending through the set screw bar.

17. The sway brace attachment set forth in claim 1, wherein axes of the threaded openings of the set screw bar and longitudinal axes defined by the slots are offset from one another by an acute angle.

18. The sway brace attachment set forth in claim 17, wherein the acute angle is from about 85 degrees to about 60 degrees.

19. The sway brace attachment set forth in claim 17, wherein the acute angle is from about 80 degrees to about 75 degrees.

\* \* \* \* \*